United States Patent [19]
Johnson et al.

[11] Patent Number: 5,595,495
[45] Date of Patent: Jan. 21, 1997

[54] ELECTRIFIED INTERIOR SPACE-DIVIDING MEMBERS WITH LOW-VOLTAGE SWITCHING SYSTEM

[75] Inventors: Ross S. Johnson, Jenison; Steven J. King, Park Township, Ottawa County, both of Mich.

[73] Assignee: Haworth, Inc., Holland, Mich.

[21] Appl. No.: 246,355

[22] Filed: May 19, 1994

[51] Int. Cl.$^6$ .................................................. H01R 25/00
[52] U.S. Cl. ................................................. 439/215; 174/49
[58] Field of Search ....................... 174/48, 49; 307/112, 307/36, 38; 439/215

[56] References Cited

U.S. PATENT DOCUMENTS

| | | | |
|---|---|---|---|
| 4,060,294 | 11/1977 | Haworth et al. | 439/215 |
| 4,367,370 | 1/1983 | Wilson et al. | 174/48 |
| 4,781,609 | 11/1988 | Wilson et al. | 439/215 |
| 5,164,609 | 11/1992 | Poppe et al. | 307/147 |
| 5,236,370 | 8/1993 | King et al. | 439/215 |
| B1 4,367,370 | 6/1987 | Wilson et al. | 174/48 |

*Primary Examiner*—Gary F. Paumen
*Attorney, Agent, or Firm*—Flynn, Thiel, Boutell & Tanis, P.C.

[57] ABSTRACT

A wall panel electrical system provided with a low-voltage switching system so that remote panel-mounted receptacle units can be switched on or off from a single remote manual switch. The manual switch is mounted on one of the panels at a convenient location, such as adjacent a door. This switch controls a power supply unit mounted on the panel, such as at the base or at worksurface height. This power supply unit is electrically coupled to a power block which comprises part of the electrical system. The power supply unit mounts interiorly thereof both a low-voltage direct current power supply in the form of a transformer and rectifying circuit, as well as an internal switching arrangement which is powered by a low-voltage circuit to control an electrical outlet. The remote switch controls and energizes the switching arrangement only when the remote switch is "on" to couple an outlet of the power supply unit to the input contacts from the power block. Remote receptacle units can be electrically connected to the power supply unit, and each remote receptacle unit also has a low-voltage interior switching arrangement coupled between the respective input contacts and the outlet thereof, which switching arrangements are likewise closed only when the remote switch unit is "on".

16 Claims, 9 Drawing Sheets

ELECTRIFIED INTERIOR SPACE-DIVIDING MEMBERS WITH LOW-VOLTAGE SWITCHING SYSTEM

FIELD OF THE INVENTION

This invention relates to an electrical system which mounts on interior space-dividing members, such as wall panels, for providing a supply of electricity to electrical equipment disposed within workstations defined by the space-dividing members, and in particular to an improved low-voltage switching system which cooperates with receptacle units mounted on the members to enable switching of outlets associated with the receptacle units from a remote control.

BACKGROUND OF THE INVENTION

U.S. Pat. Nos. 4,367,370 and 4,781,609, both owned by the Assignee of this application, disclose space-dividing systems defined by wall systems formed from series-connected electrically prewired panels, and more specifically to a wall system wherein power taps such as for light fixture and conventional electrical receptacles can be selectively positioned on the panels and selectively switchably connected, at their point of use, to any one of a plurality of different electrical circuits. The panels are typically coupled together to define working areas which are commonly referred to as workstations. The receptacle units as mounted on the panels are typically provided adjacent to the base and/or at worksurface height. Electrical devices such as lights, computers and other similar equipment are then plugged into the receptacle units. However, all such electrical devices are typically individually controlled by their own respective on-off switch since the prewired electrical system associated with the panels is not provided with any on-off switching capability.

Accordingly, it is an object of this invention to provide an improved electrical system for space-dividing members, such as wall panels of the aforementioned type, which improved electrical system incorporates a low-voltage switching system so that at least one, and preferably several, member- or panel-mounted receptacle units can be internally switched on or off from a single remote switch in a safe and simple manner to thus provide a master control over all of the electrical devices which are coupled to the receptacle units, which units form part of the low-voltage switching system.

In a preferred embodiment of the low-voltage switching arrangement of the present invention, a low-voltage manually-actuated switch unit is mounted at a convenient location, such as on one of the panels at standard switch height adjacent a door or access opening to a workstation. This switch unit is coupled by a small low-voltage conductor or cable to a power supply unit mounted on the panel, such as at the base or at worksurface height. This power supply unit is electrically coupled to a power block which comprises part of the prewired electrical system provided on the panels of the workstation. The power supply unit is electrically joined to a selected one of the 120-volt electrical circuits associated with the panel electrical system. This power supply unit mounts interiorly thereof both a low-voltage direct current power supply in the form of a transformer and rectifying circuit, as well as an internal switching arrangement which is powered by a low-voltage circuit. The conductor from the remote switch unit couples between the power supply and the interior switching arrangement of the power supply unit and energizes the interior switching arrangement only when the remote switch unit is "on". Energization of the interior switching arrangement causes closure of a switch which couples an outlet of the power supply unit to the input contacts from the power block so that the outlet is then electrically joined to the 120-volt circuit of the panel electrical system.

In the switching arrangement of this invention, as aforesaid, remote receptacle units can be electrically connected to the power supply unit. Each remote receptacle unit also has a low-voltage interior switching arrangement which is coupled between the input contacts of the respective receptacle unit and the outlet thereof. The low-voltage interior switching arrangements of these remote receptacle units likewise connect the respective outlets to the respective input contacts only when the remote switch unit is "on".

In the switching arrangement of this invention, as aforesaid, the remote switch unit may assume many forms, such as a manually-actuatable switch which can be mounted on a panel or other structural element, such as a worksurface, so that the switch unit is at a convenient location. The switch unit can be coupled to the power supply unit by a small low-voltage cable. Alternatively, the switch unit may comprise a sensor such as a motion detector, infrared detector, noise detector or the like. The switch unit may also be integrated into a data card associated with a computer to provide either manual or automatic control over the low-voltage switching arrangement. As a still further alternative, the switch unit may be a wireless remote unit which can be carried about by the user and, when activated, can transmit a signal to a receiver associated with the power supply unit for controlling the switching functions.

Other objects and purposes of the invention will be apparent to persons familiar with arrangements of this general type upon reading the following specification and inspecting the accompanying drawings.

Certain terminology will be used in the following description for convenience in reference only, and will not be limiting. For example, the words "upwardly", "downwardly" "rightwardly" and "leftwardly" will refer to directions in the drawings to which reference is made. The words "inwardly" and "outwardly" will refer to directions toward and away from, respectively, the geometric center of the system or unit and designated parts thereof. Said terminology will include the words specifically mentioned, derivatives thereof, and words of similar import.

DETAILED DESCRIPTION

Figures 1, 1A:
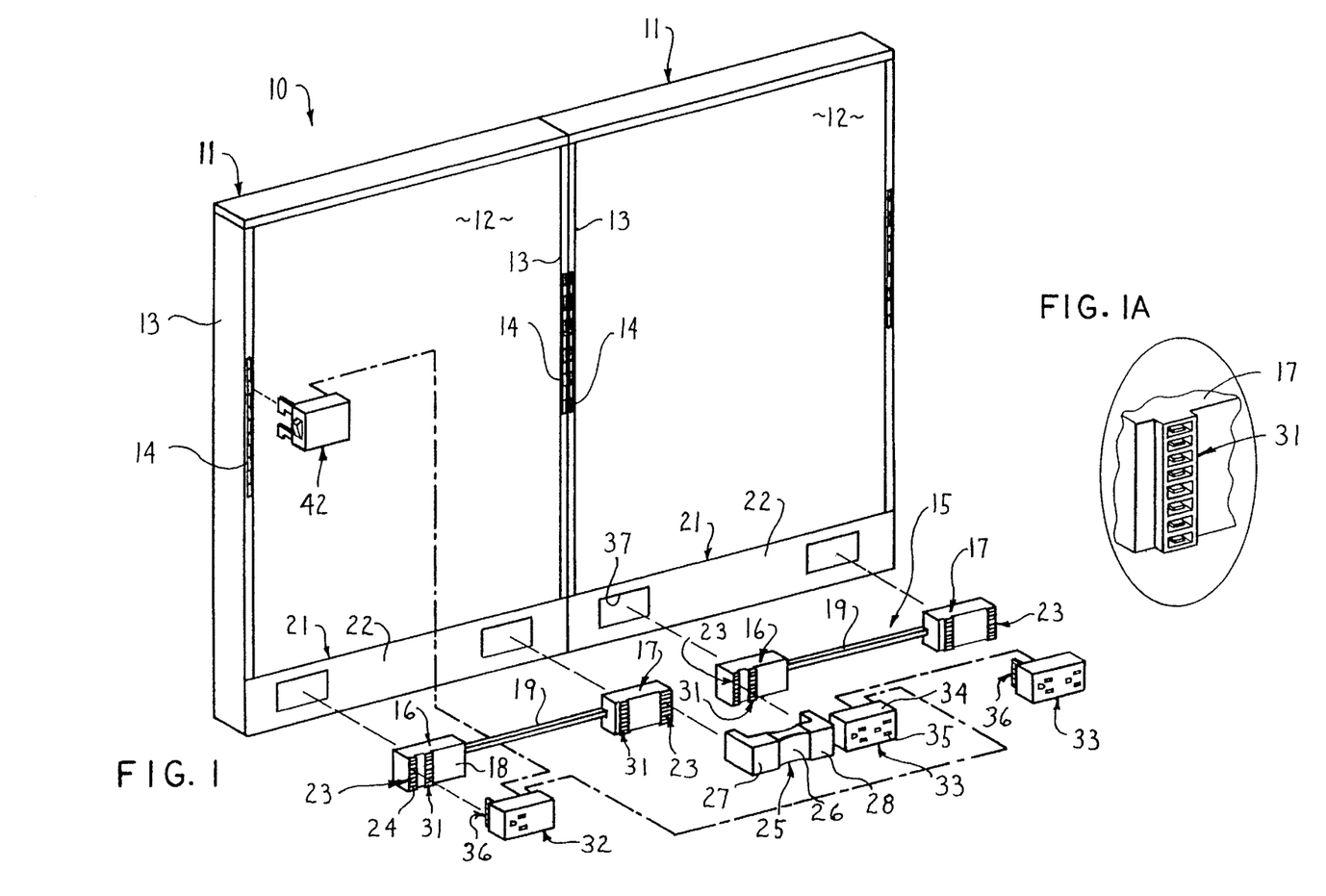
FIG. 1 is a perspective view which diagrammatically illustrates two space-dividing members (i.e. panels) of a workstation connected in series, with the panels mounting thereon an electrical system which incorporates removable receptacle units having a low-voltage switching system associated therewith according to the present invention.
FIG. 1A is a partial enlarged view of FIG. 1.

Referring to FIG. 1, there is illustrated a space-dividing system 10 formed from a series of interconnected upright space-dividing members 11 which are horizontally connected together and cooperate to define one or more workstations, with other accessories such as tables, worksurfaces, cabinets and the like typically being mounted on or positioned adjacent the upright space-dividing members so as to define an overall functional workstation. In the embodiment as illustrated by the drawings, and as described hereinafter, the space-dividing members are illustrated as prefabricated upright wall panels, with only two such panels 11 being illustrated in FIG. 1 for convenience in illustration. Panels or members of different lengths can be serially interconnected.

Each panel 11 includes an internal rigid rectangular frame formed by generally parallel top and bottom rails rigidly joined together by generally parallel side or edge rails, which frame confines therein a suitable core structure, such as a honeycomb layer or similar conventional structure. The core and frame are normally sandwiched between thin facing sheets on opposite sides of the frame, which sheets in turn are normally covered by a suitable fabric, the latter defining the exterior side faces 12 of the panel. The panels are normally disposed so that the upright ends or edges 13 are positioned adjacent one another, with the panels being disposed and joined together in aligned or angled relationship. The panels, adjacent the end edges, are also normally provided with vertically extending rows of slots 14 which open sidewardly for accommodating hangers provided on shelves, worksurfaces and like accessories which mount on and are positionable adjacent the side faces of the panel. The structure of panel 11 is well known, and one such structure is disclosed in U.S. Pat. No. 4,060,294, which patent also discloses the plastic hinge element used for hingedly connecting the adjacent vertical edges of two panels together.

As illustrated by FIG. 1, each panel 11 is provided with a prewired electrical system 15 extending longitudinally along the lower edge thereof, which system includes a substantially identical pair of power blocks or terminals 16 and 17 disposed adjacent the opposite lower corners of the panel. Each power block 16 and 17 includes a housing 18 of an electrically insulative material and supports therein a plurality of electrically conductive plates (not shown) which are electrically insulated from one another. The system of this invention comprises an eight-wire system, and hence each power block 16–17 mounts therein eight electrically conductive plates. These conductive plates as associated with the pair of power blocks 16–17 of each panel are electrically joined together by a multi-wire electrical conductor 19. The electrical system associated with each panel as defined by the joined pair of power blocks 16–17, in the illustrated and preferred embodiment, defines at least three separate electrical circuits, with the eight conductive plates in each power block being disposed to respectively define three "live" conductors, three "neutral" conductors and two "ground" conductors. Each neutral conductor is associated with a respective one of the live conductors to define a single circuit, and the remaining two conductive plates function as grounds, one being a "common" ground and the other being an "isolated" ground, depending upon the mode of use.

A raceway 21 is defined along the horizontally extending lower edge of each panel 11 so as to enclose the electrical power system 15 therein. The raceway 21 is formed by a pair of substantially identical but removable or openable side covers 22 which cooperate with one another and with the bottom frame rail to define a closed channel which extends horizontally along the bottom of the panel, in which channel the power blocks 16–17 and conductor 19 are disposed.

Each power block 16–17 has a pair of substantially identical electrical connector portions 23 associated therewith, which portions face outwardly towards opposite sides of the power block and are disposed adjacent the outer end of the power block, only one such connector portion 23 being shown in FIG. 1. Each connector portion 23 includes a plurality of shrouded electrically conductive blades or prongs 24 which, in the illustrated and preferred embodiment, includes a set of eight conductive blades which are generally disposed within a vertically oriented row, with each blade being associated with one of the conductive plates. The connector portions 23 provide electrical access to the three circuits defined by the conductive plates provided within the power block 16–17.

To electrically connect adjacent panels, the adjacent power blocks on adjacent panels are electrically joined by a flexible electrical connector 25. This connector 25 generally includes a flexible center portion 26 joined between a pair of end portions 27 and 28. This connector 25 includes an electrically insulated housing in which a plurality of electrically conductive elements are disposed in insulated relationship from one another, there being eight such conductive elements in the preferred embodiment. These eight conductive elements extend between the end portions 27 and 28 and these latter portions define plug-in connector portions which can be slidably and electrically engaged with the connector portions 23 provided on adjacent power blocks, as diagrammatically illustrated in FIG. 1, to electrically join adjacent panels 11. This flexible electrical connector 25 can be positioned for engagement with the adjacent power blocks by being engaged from either side of the wall system.

Each power block 16–17 also has a further pair of electrical connector portions 31 associated with the opposite sides thereof, which connector portions 31 are identical but as longitudinally staggered or offset relative to one another, and are longitudinally offset from the connector portions 23 which are provided on the same side of the power block. The connector portions 31 are also each defined by a vertically spaced row of shrouded conductive elements, there being eight such conductive elements in the illustrated embodiment, so as to provide access to the three circuits defined by the eight conductive blades mounted within the respective power block.

Each electrical connector portion 31 of each power block 16–17 can have a separate electrical power-tap unit 32 or 33 releasably engaged therewith, which unit typically and in the illustrated embodiment comprises a receptacle unit. Such receptacle units 32 and 33 can be plugged into a connector portion 31 associated with either side of the power block 16 or 17, whereby two such receptacle units can hence be mounted on a single power block, with the receptacle units being disposed on opposite sides of the power block so as to be accessible from opposite sides of the panel.

Each receptacle unit 32 and 33 includes a boxlike insulated housing 34 in which a plurality, typically three, of electrically conductive plates are supported in insulated relationship. These three conductive plates are disposed so as to define at least one conventional three-hole electrical outlet or receptacle 35 which is accessible through the front face of the housing 34. The receptacle unit 32 and 33 has, on the rear face thereof, an input connector portion 36 which is joined to the three conductive plates within the receptacle unit, which input connector portion 36 itself involves only three conductive plates with this connector portion being vertically shiftable into three distinct circuit-defining positions, whereby the connector portion 36 can be plugged into one of the connector portions 31 provided on the power block so that the receptacle unit is electrically engaged with solely a selected one of the three circuits provided in the power block. When engaged with the power block, the receptacle unit is positioned generally within the raceway 21 so that the front face of the receptacle unit housing is substantially flush with the side cover 22, which side cover includes therein a suitable opening 37 for accommodating the front face of the receptacle unit. This opening 37 is closed by a removable panel when the receptacle unit is not utilized at that location.

The overall construction and operation of the powered electrical system 15 as described above is conventional and well known, such system being manufactured and sold by the Assignee hereof under the name "The Power Base". This system is also disclosed in the Assignee's earlier U.S. Pat. No. 4,781,609 except that the system of this latter patent is a seven-conductor system in that it employs only a single ground, rather than two grounds as described above.

According to the present invention, the receptacle units 32 and 33 have been modified so as to be part of a low-voltage switching system 41 (FIGS. 1 and 2) which includes a remote switch unit 42 for controlling the receptacle unit 32, the latter comprising a low-voltage power supply unit. The low-voltage switching system 41 also typically includes one or more remote receptacle units 33 which receive low-voltage power from the power supply unit 32 and are controlled by the switch unit 42.

Figure 2:
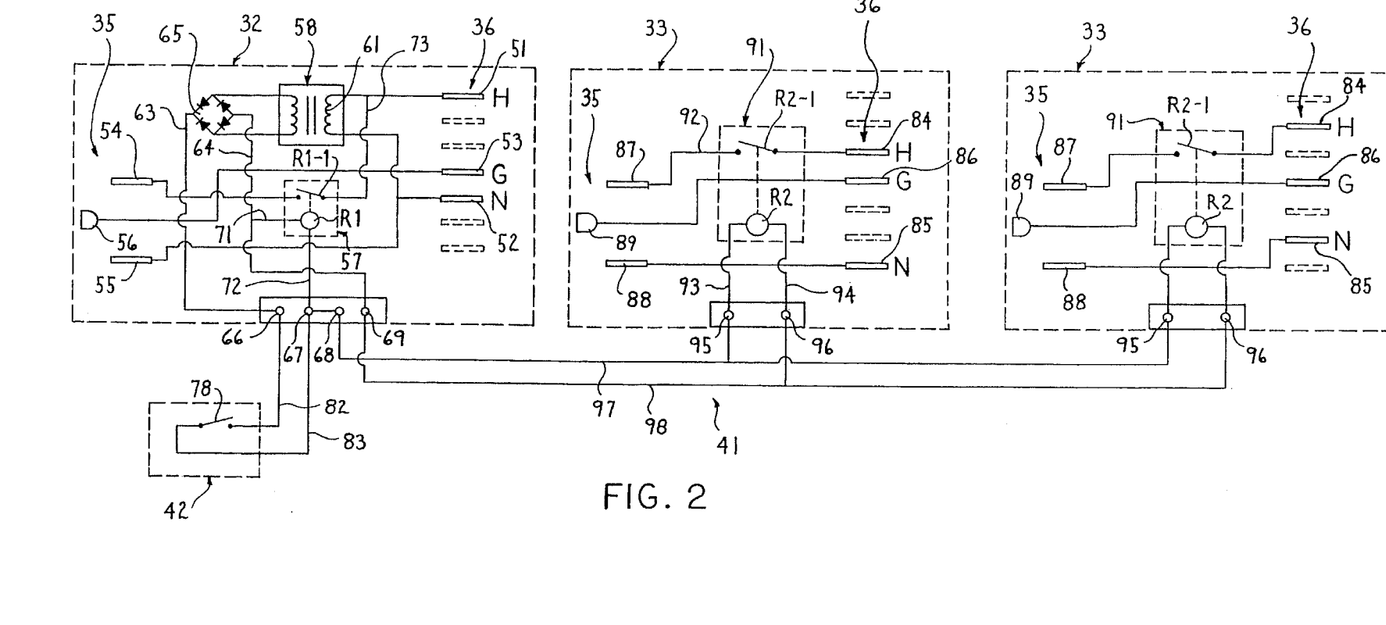
FIG. 2 is a diagrammatic illustration of the remote switching system showing the remote switch unit coupled to the panel-mounted power supply unit, the latter in turn being coupled to two remote panel-mounted receptacle units, with this figure additionally diagrammatically showing the electrical components and connections within and between the various units.

Referring to FIG. 2, the power supply unit 32, as diagrammatically illustrated, includes three electrical contacts 51, 52 and 53 which define the connector 36 and are respectively designated H, N and G and comprise the hot, neutral and ground contacts which connect to the power connector 31 on one of the power blocks 16–17 so as to supply a selected one of the standard 120-volt electrical circuits to the unit 32. The contacts 51, 52 and 53 are respectively connected to electrical contacts 54, 55 and 56 which define the standard three-prong electrical outlet 35 which is accessible through the front face of the unit housing for accommodating the plug of a standard appliance such as a computer or light. The outlet contact 54, however, is normally isolated from the input "hot" contact 51 by an internal low-voltage switching arrangement 57 which is mounted interiorly of the housing of the unit 32. This unit 32 also includes a low-voltage direct-current power supply 58 mounted therein.

The low-voltage power supply 58 comprises a small step-down transformer whose input side 61 is connected to the contacts 51 and 52 so as to be supplied with the high input voltage, normally 120 volts. The output side 62 of the transformer connects to a bridge rectifier circuit 65 to typically provide a 24-volt direct current output, with the electrical leads 63 and 64 of the rectifier being respectively connected to two terminals 66 and 69 which are mounted on the power supply unit 32. The unit 32 includes four such electrical terminals, namely 66–69, accessible from the back side of the unit housing. The terminals 67 and 68 are directly wired together and hence function as, and in fact can be structurally formed as, a single terminal.

The electrical lead 64 also has a branch lead 71 connected to the internal switching unit 57, the latter being a relay R1 to which the lead 71 connects, with a further lead 72 coupling the relay coil R1 to the terminal 67. The relay coil R1 controls a relay switch R1-1 which is provided in the electrical lead 73 which joins the hot input contact 51 to the hot outlet contact 54. Switch R1-1 is maintained in an open condition whenever relay R1 is de-energized.

With the power supply unit 32 having the internal power supply 58 and internal switching arrangement 57 as described above, the outlet 35 defined by contacts 54–56 is normally de-energized due to the relay switch R1-1 being open, even though the input contacts 51–53 are electrically joined to one of the circuits of the power block 16 or 17.

Figure 3:
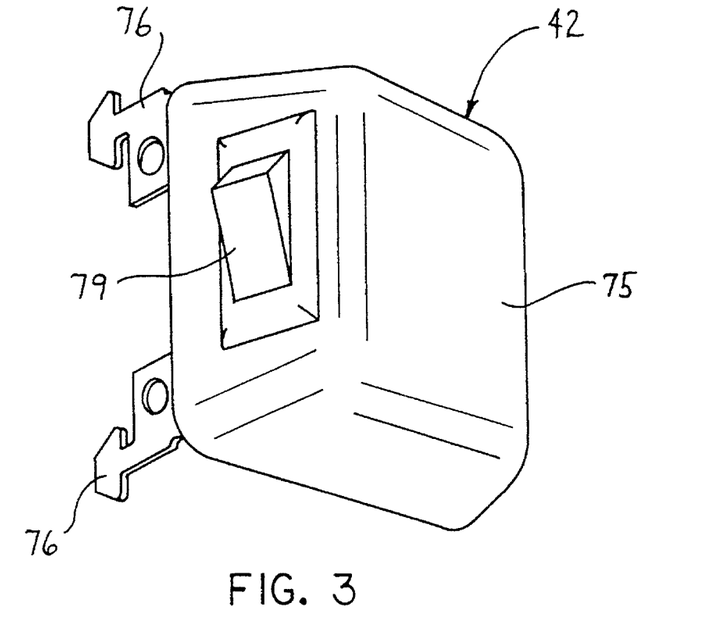
FIG. 3 is a front perspective view of the remote switch unit.

To allow the outlet 54–56 to be energized, the switch unit 42 (FIG. 2) must be coupled to the power supply unit 32 and must be switched into an "on" position. This switch unit 42, in the illustrated embodiment, includes a housing 75 (FIG. 3) which is of a hollow configuration and mounts a mounting bracket thereon which projects rearwardly from one edge, which bracket defines a pair of hooks 76 adapted to be inserted into a pair of slots 14 which extend along one of the vertical edges of the panel. This enables the switch unit 42 to be mounted at a convenient height above the floor, such as typically in the range of three feet to four feet above the floor, so as to be conveniently accessible. This switch unit 42 may typically be mounted on an edge of a panel which is positioned close to a door or access opening, or at any other convenient location.

Figure 4:
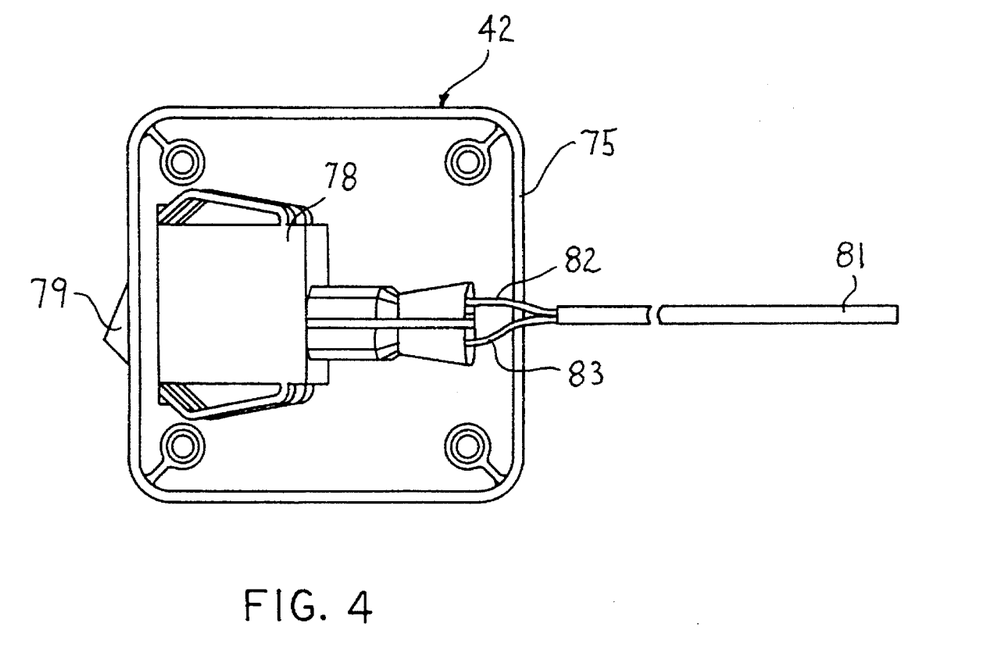
FIG. 4 is a back view thereof.
Figure 5:
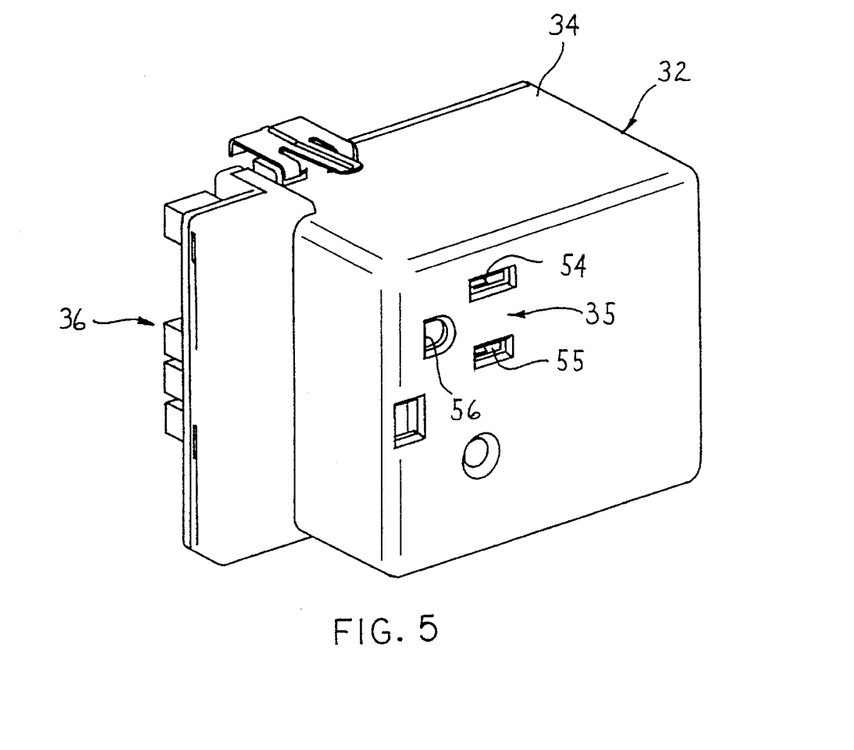
FIG. 5 is a front perspective view of the power supply unit as associated with the low-voltage switching system.
Figure 6:
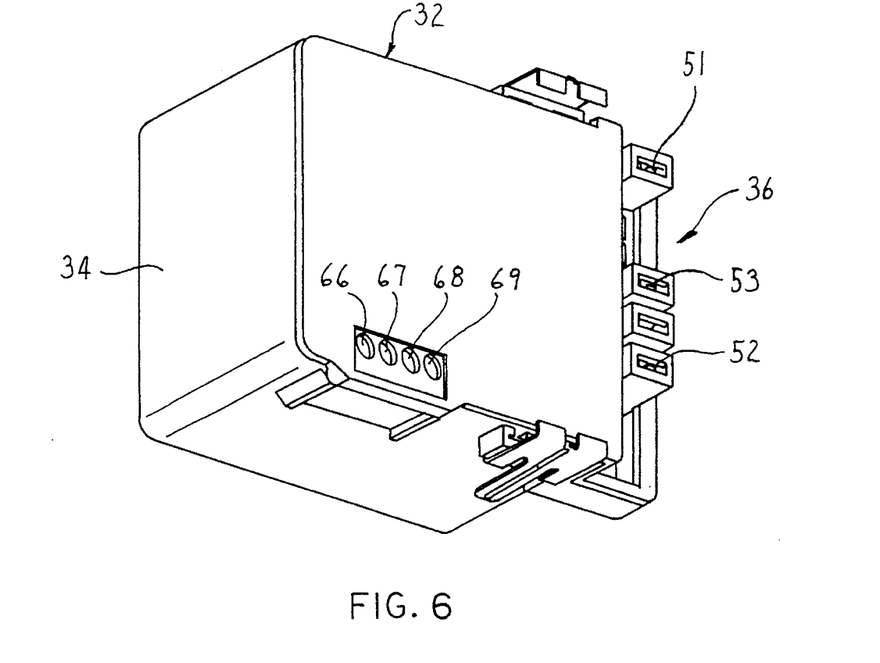
FIG. 6 is a back perspective view thereof.
Figure 7:
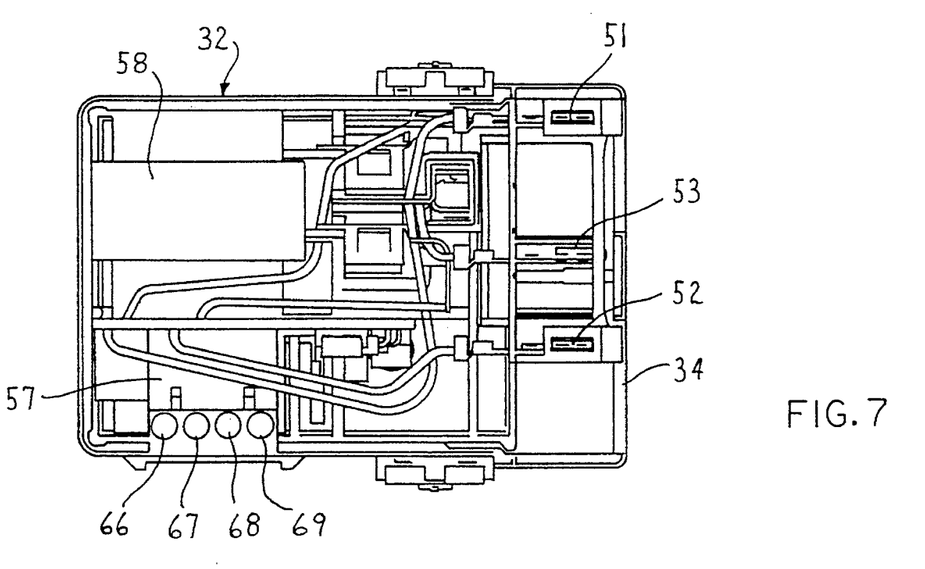
FIG. 7 is a back view of the unit of FIGS. 5 and 6, but with the back housing plate removed.
Figure 8:
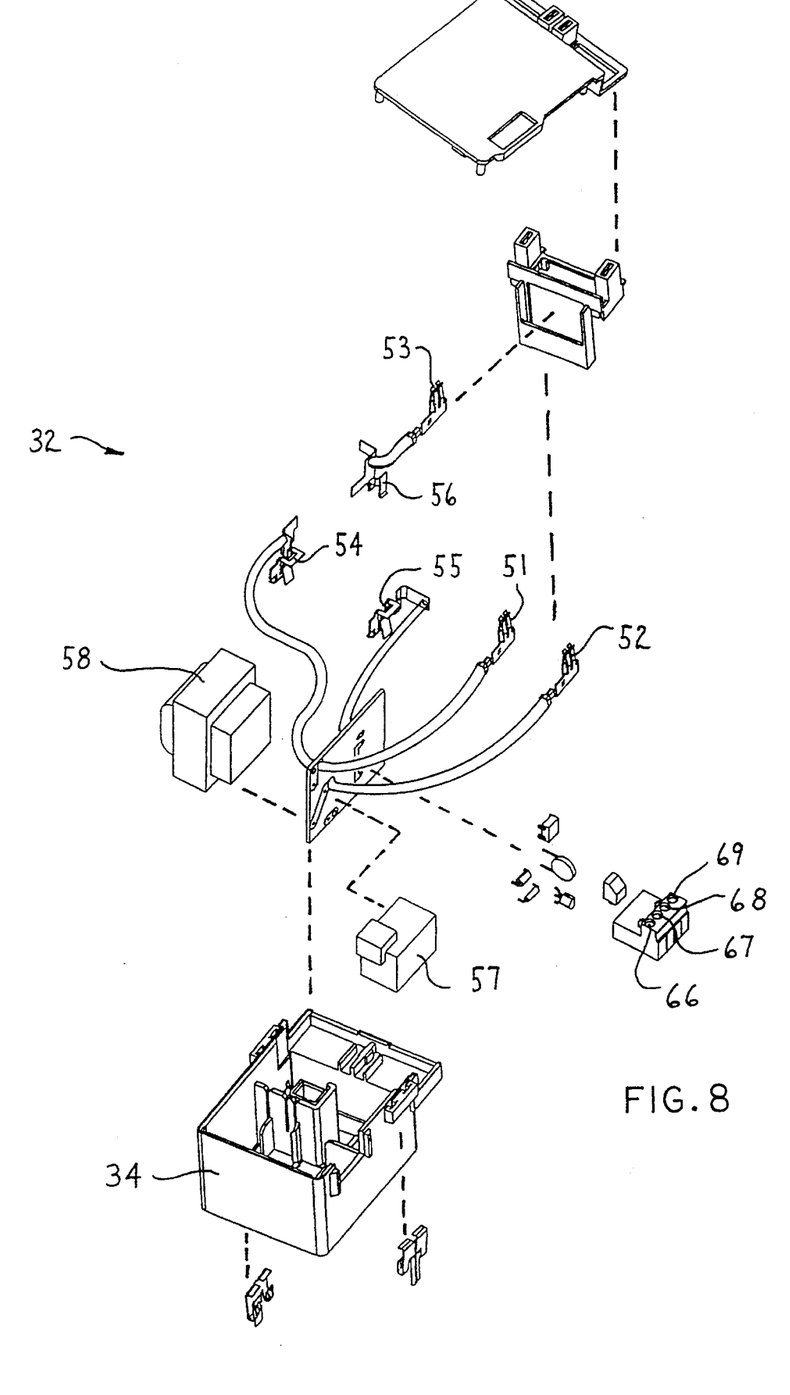
FIG. 8 is an exploded perspective view of the power supply unit of FIGS. 5–7.
Figures 9, 10, 12:
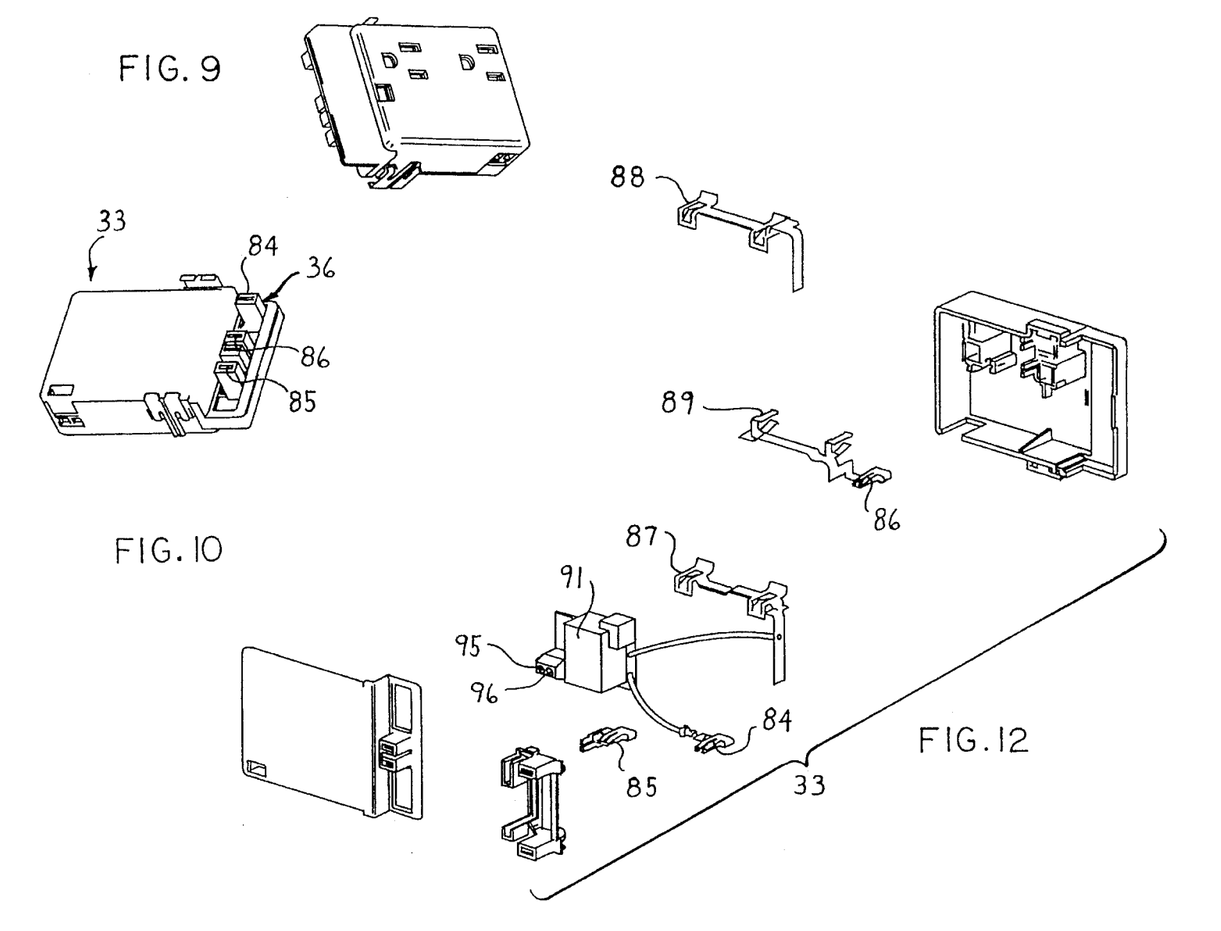
FIG. 9 is a front perspective view of a remote switchable receptacle unit according to the present invention.
FIG. 10 is a rear perspective view thereof.
FIG. 12 is an exploded perspective view of the remote receptacle unit of FIGS. 9–11.
Figure 11:
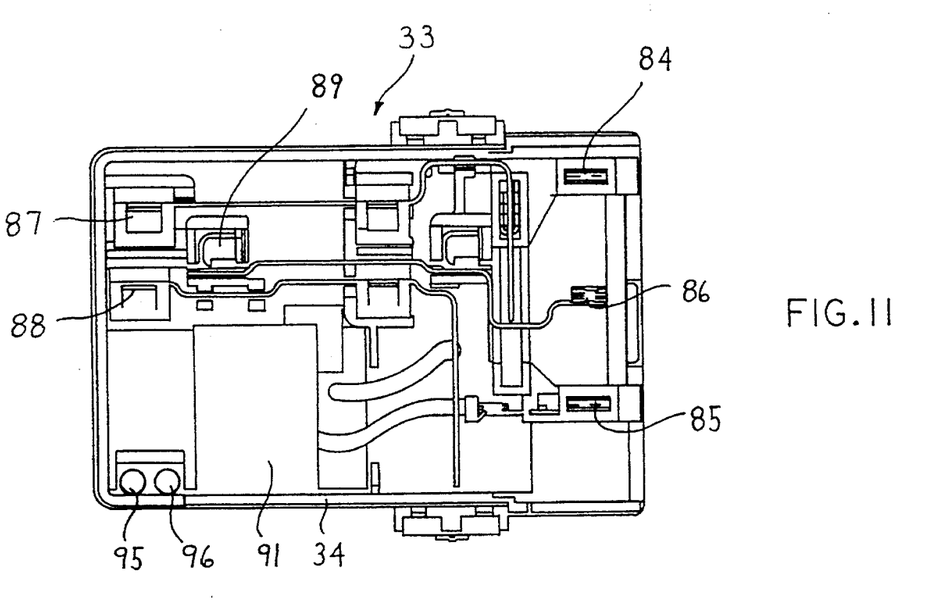
FIG. 11 is a back view of the remote receptacle unit of FIGS. 9 and 10, but with the back housing plate removed.

The housing 75 of the switch unit 42 has a conventional switch arrangement 78 (FIG. 4) mounted therein, which arrangement 78 typically has a manually-actuated toggle or rocker member 79 projecting outwardly of the housing.

The switch unit 42 has an elongate flexible electrical cable 81 connected thereto, this being a low-voltage cable having two electrical conductors 82 and 83. The cable 81 may be mounted on the panel so as to be hidden, such as by being fed from the switch unit 42 interiorly and then vertically downwardly through the end frame rail of the panel, and thence along the base so that the conductors 82 and 83 can be coupled to the terminals 66 and 67 (FIG. 2) on the power supply unit 32.

With the remotely-located switch unit 42 coupled to the power-supply receptacle unit 32 (FIG. 2), the outlet 54–56 of the unit 32 is normally de-energized. However, when the switch 78 of unit 42 is closed, then relay R1 is energized causing closure of relay switch R1-1 so that outlet 54–56 is likewise energized.

As to the remote receptacle unit 33, it is of generally similar construction in that it includes three contacts 84, 85 and 86 (FIG. 2) which define the connector 36 and couple to the selected circuit associated with the power block 16 or 17. These contacts 84–86 respectively electrically couple to the electrical contacts 87, 88 and 89 which define at least one outlet 35 associated with the front face of the receptacle unit 33.

This remote receptacle unit 33 also has a switching arrangement 91 (FIG. 2) mounted interiorly of the housing thereof, the latter including a relay R2 which controls a normally open relay switch R2-1 associated with the lead line 92 which couples the hot input contact 84 to the hot outlet terminal 87. The relay R2 is coupled to leads 93 and 94 which are respectively coupled to the terminals 95 and 96 as provided on and accessible from the rear side of the receptacle unit 33. These terminals 95 and 96 can be respectively electrically coupled to the terminals 68 and 69 provided on the unit 32 by a further low-voltage cable which includes two conductors 97 and 98.

As indicated by FIG. 2, several such remote receptacle units 33 can be connected in electrically parallel relationship merely by joining the terminals 95–96 of one unit 33 with the terminals 95–96 of a further such unit 33. Alternatively, each remote unit 33 can have the terminals 95–96 thereof connected directly back to the respective terminals 68–69 of the power supply unit 32.

With the system 41 connected as illustrated by FIG. 2, the electrical outlets 35 associated with each of the units 32 and 33 is normally de-energized due to the relay switches R1-1 and R2-1 being open. Whenever the switch unit 42 is closed, however, then all of the relay coils R1 and R2 are energized causing closure of the respective switches R1-1 and R2-1. This causes all of the outlets 35 associated with the coupled units 32 and 33 to be energized. Any appliances or electrical devices plugged into these outlets 35 can thus be simultaneously controlled so as to be "on" or "off" merely by control of the single remote switch 42.

With respect to the remote receptacle units 33, such units will typically employ two standard three-hole outlets 35 associated with the single unit housing, and both outlets can be controlled by the respective internal relay switch 91 if desired. Alternatively, the internal relay switch can be wired so as to control only one of the respective outlets, with the other being continuously joined to the input contacts 84–86 if desired so that the remote receptacle unit 33 can have one continuously energized outlet and one switchable outlet if desired.

With the low-voltage switching system 41 of this invention, as briefly described above, some or all of the receptacle units associated with a workstation can be easily and remotely controlled by a single switch, namely the switch unit 42, which switch unit can be positioned at a convenient location, such as adjacent a door or access opening into a workstation. This single switch unit 42 permits activation or deactivation of all of the units which are coupled thereto, including a single power supply unit 32 as well as several remote receptacle units 33. The control provided by this switching system, however, uses low-voltage direct current to provide a safe but simple hookup between the components of the system, and when activated permits each receptacle unit to provide standard 120-volt power to the outlets for connection to whatever electrical equipment is being utilized in the workstation.

In addition, with this arrangement the units 32 and 33 can be easily mounted on and connected to the selected circuit of the power block at whatever desired location on the panel or panels, with the power supply unit 32 preferably being positioned at a location which is closest to the mounting location of the switch unit 42. Two-conductor low-voltage cables (which defines the conductors 97–98) can then be provided so as to connect the unit 32 to a remote unit 33, and to similarly connect remote units 33 together, the cables for such connections being positioned within the raceway which extends along the bottom of the panels.

While the power supply unit 32 has been disclosed as having at least a single outlet 35 associated therewith, and such is the preferred construction, nevertheless it will be appreciated that the outlet 35 can be eliminated from the unit 32 if desired. In such case the unit 32 would function solely as the low-voltage direct current power supply for the switching relays of the remote receptacle units 33 coupled thereto.

Further, while the units 32 and 33 of the invention and as described above are preferably of the switchable type so as to permit selection of one of several circuits provided by the power block 16 or 17, with the circuit selection occurring prior to the unit 32 or 33 being plugged into the power block as disclosed in detail in Assignee's aforesaid U.S. Pat. No. 4,781,609, it will nevertheless be appreciated that the low-voltage switching system of this invention is equally applicable to receptacle units which are used for connection to power blocks mounted on space-dividing members such as wall panels when the receptacle unit defines solely a non-switchable single circuit. As to the construction of the electrical system including the power blocks and receptacle units, reference is made to aforesaid U.S. Pat. No. 4,781,609, the disclosure of which is incorporated herein in its entirety.

Still further, while the low-voltage switching system of the present invention has been described above in conjunction with an electrical system which cooperates with upright interior wall panels, such switching system can also be associated with an electrical system provided on other upright space-dividing members which function to define workstations. For example, U.S. Pat. No. 5,236,370, also owned by the Assignee hereof, discloses a similar electrical system which is mounted interiorly of elongate space-dividing beams which cooperate to define workstations, with the electrical system having the power blocks and removable receptacle units positioned substantially at worksurface height. The receptacle units of the system disclosed in this '370 patent could obviously be modified to define both power supply units and remote receptacle units controlled by a single remote switch, substantially in accordance with the invention as described above. The low-voltage switching system of the present invention, and its application to an electrical system associated with upright space-dividing members which define workstations, incorporates an arrangement of the type as disclosed in the aforesaid '370 patent.

Figure 13:
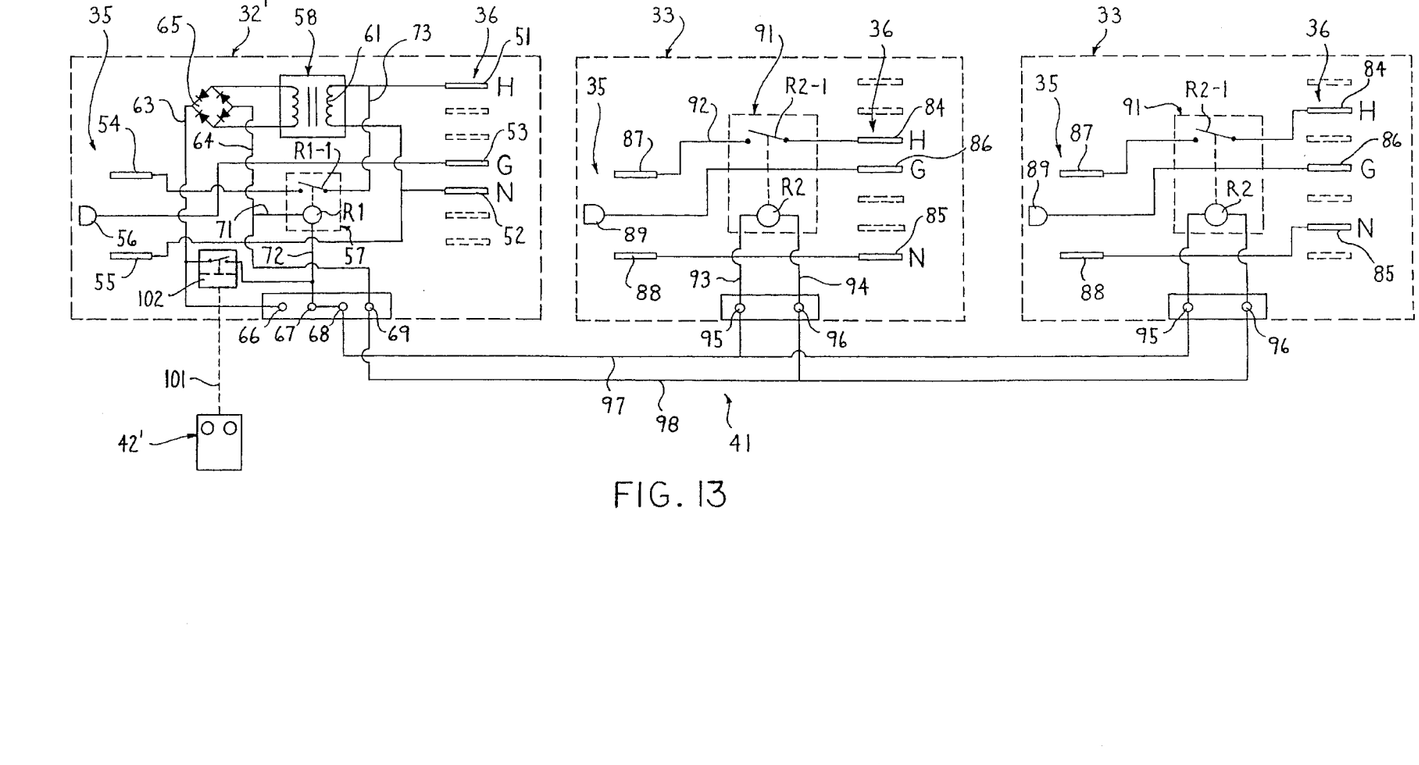
FIG. 13 is a diagrammatic illustration similar to FIG. 2 but illustrating a variation wherein the switch unit is a remote wireless unit.

While the switching arrangement 42 as described above is illustrated with a control switch unit 42 which comprises a conventional manually-actuated rocker type switch connected by an electric cable to the power supply unit 32, it will be appreciated that the control switch unit 42 may be disposed at a wide variety of convenient locations which are remote from the power supply and receptacle units 32 and 33, and may be mounted on different components as desired, such as on a wall panel, a worksurface or other desired component. Further, the remote control switch 42 may assume a significant number of variations while still permitting master control over the switching function of the low-voltage switching arrangement. For example, the main control switch 42 may be integrated into a computer, or may comprise a sensor such as a motion, noise or temperature sensor. The remote switch 42 may also be a portable wireless-type switch, such as a signal transmitter of the type commonly utilized for activating vehicle door locks. Use of this latter type switch is believed highly desirable since it provides the user of the workstation with a high degree of flexibility with respect to controlling the low-voltage switching arrangement. A remote wireless control switch is diagrammatically illustrated in FIG. 13.

In this variation, the remote switch unit 42' (FIG. 13) can be a small and compact unit possessing portability so as to be carried about if desired, and when activated is capable of transmitting a wireless signal (as indicated by dotted line 101 in FIG. 13) to a receiver 102 associated with the power supply unit 32'. Examples of such wireless remote switch units include those which transmit radio frequency or infrared signals. The power supply unit 32' is otherwise identical to the unit 32 except for inclusion therein of the signal receiver which in turn controls the internal switching of the unit 32'.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an upright interior wall system formed by a plurality of serially-connected interior wall panels, at least some of said panels having electrified power blocks positioned interiorly thereof, said power blocks having electrical output connectors for releasable pluglike engagement with portable power-tap units which releasably mount on the power blocks generally interiorly of the panels, each said power-tap unit having an electrical input connector which is releasably engageable with a said electrical output connector of a said power block, the improvement comprising:

a first said power-tap unit comprising a low-voltage power supply unit releasably mounted on one said electrical output connector of a said power block;

said power supply unit having first and second low-voltage terminal means, and high-to-low voltage converting means connected between said first terminal means and the respective electrical input connector for stepping down the voltage to provide a low voltage at said first terminal means;

a second said power-tap unit comprising a receptacle unit releasably mounted on a said electrical output connector of one said power block and having a three-hole electrical outlet for accommodating a conventional electrical plug;

said receptacle unit having an interior normally-open switching means connected between said outlet and the respective electrical input connector for permitting electrification of said outlet only when said interior switching means is closed, said interior switching means including low-voltage activating means for activating said interior switching means into a closed position in response to low-voltage activation, said receptacle unit having third terminal means mounted thereon and connected to said activating means;

electrical cable means connected between said second and third terminal means for transmitting a low voltage signal therebetween; and a low-voltage switch unit disposed at a location remote from said power supply and receptacle units for controlling supply of low-voltage from said converting means to the activating means of said receptacle unit.

2. A wall system according to claim 1, wherein said low-voltage power supply unit includes a second three-hole electrical outlet for accommodating a conventional electrical plug and an internal normally-open switching means connected between said second outlet and the respective electrical input connector for permitting electrification of said second outlet only when said switching means is closed, and said switching means including a low-voltage activating means which is coupled to said second terminal means for closing said switching means when said activating means is activated by a low voltage due to closure of said switch unit.

3. A wall system according to claim 2, wherein the switching means associated with said power supply unit and each said receptacle unit comprises a normally-open relay switch which is connected between an electrified contact of the respective electrical input connector and a contact of the respective outlet, and said activating means comprises a low-voltage direct current relay coil which activates and closes the respective relay switch when the relay coil is energized.

4. A wall system according to claim 3, wherein the first and second terminal means on said power supply unit together define first, second and third terminals, said remote switch unit being electrically connected to said first and second terminals, the low-voltage output side of said converting means being connected to said first and third terminals, and the relay coil of said power supply unit being electrically connected between said second and third terminals; and wherein said third terminal means on said receptacle unit includes forth and fifth terminals which are electrically connected to the relay coil of said receptacle unit, said fourth and fifth terminals being electrically connected to the second and third terminals on said power supply unit.

5. A wall system according to claim 1, wherein the switching means associated with said receptacle unit comprises a normally-open relay switch which is connected between an electrified contact of the respective electrical input connector and a contact of the respective outlet, and said activating means comprises a low-voltage direct current relay coil which activates and closes the respective relay switch when the relay coil is energized.

6. A wall system according to claim 1, wherein said switch unit includes elongate cable means connected to said first and second terminal means for controlling supply of low voltage to said activating means.

7. In an upright interior wall system formed by a plurality of serially-connected interior wall panels, at least some of said panel having electrified power blocks interiorly thereof, said power blocks having electrical output connectors for releasable pluglike engagement with portable power-tap units which releasably mount on the power blocks generally interiorly of the panels, each said power-tap unit having an electrical input connector which is releasably engageable with a said electrical output connector of a said power block, the improvement comprising:

a first said power-tap unit comprising a low-voltage power supply unit releasably mounted on one said electrical output connector of a said power block;

said power supply unit having first and second low-voltage terminal means, and high-to-low voltage converting means connected between said first terminal means and the respective electrical input connector for stepping down the voltage to provide a low voltage at said first terminal means;

said power supply unit having a three-hole electrical outlet for accommodating a conventional electrical plug;

said power supply unit also having internal normally-open switching means connected between said outlet and the respective electrical input connector for permitting electrification of said outlet only when said switching means is closed, said switching means including low-voltage activating means connected between said second terminal means and an output side of said converting means for closing said switching means only when energized by a low-voltage; and a low-voltage switch unit disposed at a location remote from said power supply unit for controlling supply of low-voltage current from said converting means to said switching means.

8. A wall system according to claim 7, wherein said switch unit includes an electrical cable means connected to said first and second terminal means for transmitting a low-voltage signal.

9. A wall system according to claim 7, wherein said switch unit includes a housing mounting an electrical switch interiorly thereof and having a manually actuatable switch member positioned exteriorly of said housing, and a mounting bracket secured to said housing for releasable attachment to a said wall panel.

10. A wall system according to claim 9, wherein the mounting bracket includes a pair of platelike cantilevered hooks which project horizontally in vertically spaced relation for engagement with a vertically slotted upright associated with the panel.

11. A wall system according to claim 7, including a second said power tap unit comprising a receptacle unit mounted on a further said power block and having at least one three-hole electrical outlet for accommodating a conventional electrical plug, said receptacle unit having an interior normally-open switching means connected between said outlet and the respective electrical input connector for permitting electrification of said outlet only when said interior switching means is closed, said interior switching means including low-voltage activating means for activating said interior switching means into a closed position in response to low-voltage activation, said receptacle unit having third terminal means mounted thereon and connected to said activating means; and electrical cable connected between said second and third terminals means for transmitting a low-voltage signal therebetween.

12. In a workstation including a plurality of horizontally serially connected upright space-dividing members, such as panels or beams, at least some of said space-dividing members having electrified power blocks positioned interiorly thereof and electrically joined together for transmitting electricity from member to member, said power blocks having electrical output connectors for releasable pluglike engagement with portable power-tap units which releasably mount on the power blocks generally interiorly of the space-dividing members, each said power-tap unit having an electrical input connector which is releasably engageable with a said electrical output connector of a said power block, the improvement comprising:

a first said power-tap unit comprising a low-voltage power supply unit releasably mounted on one said electrical output connector of a first said power block, said power supply unit having high-to-low voltage converting means connected to the respective electrical input connector for stepping down the voltage supplied to the power supply unit from said first power block to provide a low-voltage output;

a second said power-tap unit comprising a receptacle unit releasably mounted on one said electrical output connector of a second said power block, said receptacle unit having a three-hole electrical outlet accessible through a wall thereof for accommodating a conventional electrical plug;

said receptacle unit having normally-open switching means connected between said outlet and the respective electrical input connector for permitting electrification of said outlet from the respective input connector only when said switching means is closed, said switching means including low-voltage activating means for closing said switching means in response to a low-voltage activation;

electrical cable means connected between the output of said power supply unit and the activation means of said receptacle unit for supplying a low-voltage signal to said activation means; and a switch unit for permitting the low-voltage signal to be supplied to said receptacle unit only when said switch unit is in a closed position, said switch unit being mounted at a location which is remote from said power supply and receptacle units.

13. A workstation according to claim 12, wherein said power supply unit includes a rectifier means connected to the output of said converting means for converting the electrical output from AC to DC.

14. A workstation according to claim 12, wherein said power supply unit also has a second three-hole electrical outlet accessible through a wall thereof for accommodating a conventional electrical plug, and interior normally-open switching means connected between said outlet and the respective electrical input connector for permitting electrification of said second outlet only when said switching means in closed, said switching means including a low-voltage activating means which is electrically coupled to the output of said converting means for permitting energization of said second outlet only when the switch unit is closed.

15. A workstation according to claim 12, wherein said switch unit comprises a portable and compact unit having means for transmitting a wireless signal to said power supply unit, and said power supply unit having a receiver therein for said wireless signal.

16. A workstation according to claim 12, wherein said switch unit comprises a low-voltage manually-actuated switch which is connected to said power supply unit by a low-voltage cable for transmitting a low-voltage signal to the power supply unit only when the switch is activated.

\* \* \* \* \*